United States Patent [19] [11] 4,430,467
Lesniewski et al. [45] Feb. 7, 1984

[54] SELF-EXTINGUISHING PROPYLENE POLYMER

[75] Inventors: Joseph M. Lesniewski, Hopewell; Michael J. Breza, Trenton, both of N.J.

[73] Assignee: Saytech, Inc., Sayreville, N.J.

[21] Appl. No.: 337,577

[22] Filed: Jan. 7, 1982

[51] Int. Cl.³ .......................... C08K 5/01; C08K 5/34
[52] U.S. Cl. .................................... 524/89; 524/120; 524/411; 524/486
[58] Field of Search ........................... 524/94, 486, 89

[56] References Cited

U.S. PATENT DOCUMENTS

| | | | |
|---|---|---|---|
| 3,420,786 | 1/1969 | Weber et al. | 260/2.5 |
| 3,786,623 | 1/1974 | Dotson et al. | 260/45.75 B |
| 3,850,882 | 11/1974 | Underwood et al. | 260/45.75 B |
| 3,917,642 | 11/1975 | Wolford et al. | 260/326 |
| 3,923,734 | 12/1975 | Dotson et al. | 260/45.75 B |
| 4,286,071 | 8/1981 | Rigler et al. | 524/486 |
| 4,320,038 | 3/1982 | Keogh | 524/94 |

FOREIGN PATENT DOCUMENTS 919856 1/1973 Canada .
2017234 5/1970 France .

Primary Examiner—John Kight, III
Assistant Examiner—R. A. White
Attorney, Agent, or Firm—Donald L. Johnson; John F. Sieberth; Teresa M. Stanek

[57] ABSTRACT

A flame retardant polymer composition comprising 2,3-dimethyl-2,3-diphenylbutane, a halogenated bisimide corresponding to the formula:

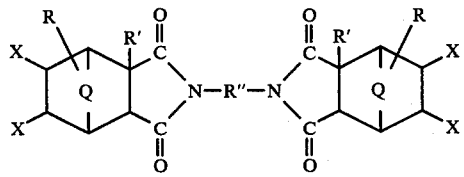

wherein Q is methylene or oxygen, X is chlorine or bromine, R is hydrogen or an alkyl group containing 1–5 carbon atoms, R' is hydrogen or methyl and R" is an organic group containing 1–15 carbon atoms, and a polypropylene polymer selected from the group consisting of polypropylene and copolymers containing at least 50% by weight of co-polymerized propylene monomer.

3 Claims, No Drawings

SELF-EXTINGUISHING PROPYLENE POLYMER

BACKGROUND

1. Field of the Invention

The present invention relates to a flame retardant composition. More particularly, this invention relates to a polypropylene composition which contains a halogenated aliphatic bisimide and 2,3-dimethyl-2,3-diphenylbutane.

2. Description of the Prior Art

A variety of compounds are known which impart satisfactory flame resistance, smoke suppression and self-extinguishing properties to thermoplastic compositions.

A brominated cyclic bisimide which is a recognized flame retardant additive in polypropylene is N,N'-1,2-ethane-bis(5,6-dibromonorbornane-2,3-dicarboximide). Wolford et al, U.S. Pat. No. 3,917,642, teach the use of novel compounds useful as flame retardants in normally flammable organic polymers. N,N'-1,2-ethane-bis(5,6-dibromonorbornane-2,3-dicarboximide) is specifically claimed. Dotson et al, U.S. Pat. No. 3,923,734, claim the use of brominated cyclic bisimides in polymer compositions. Dotson et al, U.S. Pat. No. 3,786,023, teach the flame retarding of polypropylene with N,N'-hexane-1,6-bis(5,6-dibromonorbornane-2,3-dicarboximide) and a synergist. The synergist may be a metal oxide or a phosphite.

A variety of flame retardant synergists are frequently used in polymer compositions. The use of 2,3-dimethyl-2,3-diphenylbutane as a synergist in certain polymer compositions is known. Weber et al, U.S. Pat. No. 3,420,786, teach the flame retarding of polystyrene foam with aliphatic bromine containing compounds such as hexabromocyclododecane and 2,3-dimethyl-2,3-diphenylbutane. These particular bromine containing compounds are effective flame retardants but are thermally unstable. French Demande 2,017,234 teaches flame retardant polypropylene containing these same compounds. Underwood et al, U.S. Pat. No. 3,850,882 teach the flame retarding of propylene with aromatic bromine compounds and 2,3-dimethyl-2,3-diphenylbutane. These aromatic bromine compounds are thermally stable, however, they are less efficient flame retardants than aliphatic bromine compounds.

Canadian Pat. No. 919,856 teaches a flame retardant additive system which consists of compounds such as 2,3-dimethyl-2,3-diphenylbutane and halogen-containing compounds having chlorine or bromine in the connecting bridge between two cycloalkyl groups.

It has now been discovered that 2,3-dimethyl-2,3-diphenylbutane may be used in polypropylene compositions along with halogenated aliphatic bisimides as described in this invention to improve the flame-retarding of the polypropylene composition. The halogenated aliphatic bisimides described in this invention are efficient flame retardants and thermally stable. By "thermally stable" it is meant that the compound does not degrade appreciably under normal processing conditions. If a compound does degrade under processing conditions then a toxic and corrosive gas is generated (hydrogen bromide) and the flame retardant properties of the compositions are decreased. The halogenated aliphatic bisimide flame retardant has low volatility, is stable at polypropylene processing temperatures, is readily dispersible in polypropylene, is compatible with polypropylene, and is effective in sufficiently low concentrations to minimize the degradation of physical properties of the polypropylene.

SUMMARY OF THE INVENTION

According to the present invention a halogenated aliphatic bisimide, corresponding to the formula:

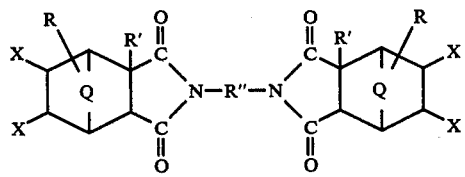

wherein Q is methylene or oxygen, X is chlorine or bromine, R is hydrogen or an alkyl group containing 1-5 carbon atoms, R' is hydrogen or methyl and R" is an organic group containing 1-15 carbon atoms, and 2,3-dimethyl-2,3-diphenylbutane may be added to a polypropylene composition to provide improved flame retardant properties. A desirable halogenated aliphatic bisimide is N,N'-1,2-ethane-bis(5,6-dibromonorbornane-2,3-dicarboximide). Additional synergists or additives may be incorporated in these compositions.

DESCRIPTION OF THE PREFERRED EMBODIMENTS

Suitable polypropylene polymers intended for use in the practice of this invention include polypropylene and copolymers of propylene which contain at least 50% by weight of co-polymerized propylene monomer. Other normally flammable co-polymers of olefins having from 2 to 8 carbon atoms per molecule may be present in the polymer. Examples of other suitable polymeric compounds are polymers and co-polymers of olefins such as those of ethylene, butene, 2-methyl-propene-1, ethylene-hexene-1, ethylene-propylene co-polymers, and the like. Blends or mixtures of the above compounds may be present in the polymer of the present invention.

The olefin polymers of the present invention are commercially available, normally solid resins which can be formed by any of the numerous techniques known in the art. Polypropylene can be formed by the polymerization of propylene in an inert hydrocarbon medium at 25° to 110° C. The effluent from the reactor is treated to remove residual monomer by flushing, for example, solvent and soluble polymer are removed, and the catalyst is deactivated and extracted. Coordination catalysts suitable for polymerizing propylene are exemplified by a titanium halide, preferably TiCl$_2$.⅓AlCl$_3$, an aluminum compound, preferably a trialkylaluminum or alkylaluminum compound, such as diethylaluminum chloride and, optionally, a Lewis base. However, since the various types of polymers of olefins which can be rendered flame-resistant by the additive system of this invention are, as previously indicated, well known and commercially available materials, the process for their production is not considered to form a part of this invention.

Flame retardant halogenated aliphatic bisimides of the present invention are compounds corresponding to the formula:

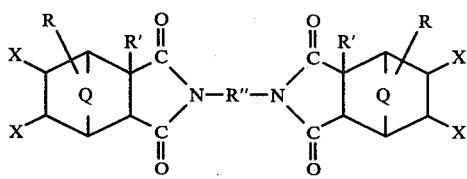

wherein Q is methylene or oxygen, X is chlorine or bromine, R is hydrogen or an alkyl group containing 1–5 carbon atoms, R' is hydrogen or methyl and R" is an organic group containing 1–15 carbon atoms.

R" may be a straight-chain or branched, saturated or unsaturated, halogenated or unhalogenated aliphatic or cycloaliphatic hydrocarbon group of 1–15 carbons, such as methylene, ethylene, vinylene, 1,2-dibromoethylene, propylene, 2,3-dibromobutylene, cyclohexylene, bromocyclohexylene, 2,3-dibromocyclohexylene, cyclohexenylene, dodecylene, 4,4'methylene-dicyclohexylene, etc., a halogenated or unhalogenated aromatic hydrocarbon group of 1–15 carbons, such as phenylene, bromophenylene, toluylene, bromotoluylene, xylylene, bromoxylylene, etc.; an aliphatic, cycloaliphatic or aromatic keto group of 1–15 carbons, such as

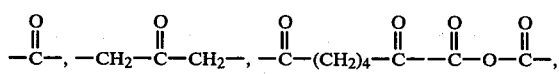

etc., an aliphatic, cycloaliphatic or aromatic ether group of 2–15 carbons, such as —CH₂—O—CH₂—, —CH₂CH₂—O—CH₂CH₂—, etc. R" is preferably 1–12 carbon atoms. More preferably, R" is ethylene.

The halogen content of the flame retardant bisimide should be sufficient to satisfy the minimum requirements of flame retardancy. X is preferably bromine. It is preferred that the bromine content be at least about 30% by weight of the bisimide, more preferably at least about 45% by weight. Usually the bisimides have bromine contents in the range of about 40 to 60% by weight of the flame retardant bisimide.

In a preferred embodiment, Q is methylene, X is bromine, R is hydrogen and R' is hydrogen. This preferred embodiment has the following structure:

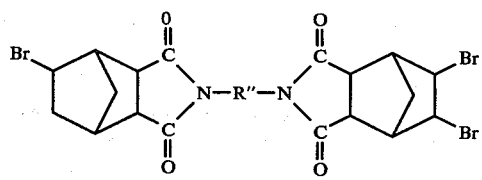

In a more preferred embodiment, Q is methylene, X is bromine, R is hydrogen, R' is hydrogen and R" is ethylene. The more preferred halogenated aliphatic bisimide is N,N'-1,2-ethane-bis(5,6-dibromonorbornane-2,3-dicarboximide). This compound combines the effectiveness of aliphatic bromine with excellent heat stability. It is non-volatile, non-blooming, thermally stable, chemically inert and resistant to extraction by aqueous and non-aqueous solvents. It also has a high degree of stability to ultraviolet light.

There is no definite upper limit for the amount of total additives to be incorporated in propylene. Ordinarily, additives are used at the lowest level which will provide the desired degree of flame retardance and which will produce the least change in the physical properties of the polypropylene. The halogenated aliphatic bisimides intended for use in the present invention are unusually efficient. They are normally present in low concentrations. Frequently, they are present in a range of about 0.001–25 weight percent based on the weight of the entire polypropylene composition. Preferably, they are present in a range of about 0.01–5 weight percent based on the weight of the entire composition.

In the present invention 2,3-dimethyl-2,3-diphenylbutane is used as a synergistic co-additive. It is frequently referred to as bicumyl. The useful concentration of 2,3-dimethyl-2,3-diphenylbutane varies over a wide range. It is normally employed in a concentration of about 3 to about 100 weight percent, based on the weight of the halogenated flame retardant. Preferably, the concentration of the bicumyl is about 50 weight percent, based on the weight of the halogen-containing flame retardant.

Other types of flame retardant synergists may be present. Common synergists include free radical generating compounds such as dicumyl peroxide, a conventional metal compound synergist, or an aliphatic or cycloaliphatic phosphite or thiophosphite. Of these compounds, antimony oxide or a trialkyl phosphite is preferred. Antimony oxide is normally employed in a concentration of about 20–100%, preferably, about 50%, based on the weight of the flame retardant used in the polypropylene composition. Other types of synergists such as trialkyl phosphite are normally employed in a concentration of about 3–100%, based on the weight of the flame retardant.

The bisimides of the present invention are conveniently prepared by (1) reacting about two molar proportions of an anhydride corresponding to the formula:

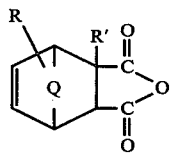

wherein Q is methylene or oxygen, R is hydrogen or an alkyl group containing 1–5 carbon atoms, and R' is hydrogen or methyl, with one molar proportion of a diamine corresponding to the formula H₂N—R"—NH₂ wherein R" is an organic group containing 1–15 carbons at temperatures of about 80°–150° C., typically in an inert organic solvent such as benzene, toluene, xylene, pentane, heptane, cyclohexane, dibutyl ether, dioxane, 1,1,2-trichloroethane, chlorobenzene, etc., and (2) reacting one molar proportion of the resultant bisimide with at least about two molar proportions of bromine or chlorine at temperatures of about 0°–80° C., typically in an inert organic medium, such as an organic acid, chloroform, benzene and/or dioxane, etc.

It is to be understood that the mixture of this invention can have the usual fillers, dyes, pigments, plasticizers, anti-static agents, stabilizing agents, and the like incorporated therein, if desired. These compounds are well known in the art.

The production of the flame retardant compositions can be carried out in various manners. For example, mixtures of the propylene compositions of the present invention can be prepared by mixing the halogenated aliphatic bisimide flame retardant with 2,3-dimethyl-2,3-diphenylbutane and other optional additives into the propylene at an elevated temperature in an extrusion press or a kneader such as a Banbury mixer. The components can also be dissolved in a common solvent, the solution can be admixed with the polymer and then the solvent recovered. In the case of granular or bead like plastic compositions, the surface of the granule may be coated.

The invention is demonstrated in the following examples, but it is to be understood that the invention is not limited to these specific examples.

EXAMPLES 1-10

The polypropylene compositions listed in Table I were prepared in a Brabender plasticorder, fitted with a number 6 roller head having a 60 cc capacity and heated at a stock temperature of 356° F. at 60 rpm for fifteen minutes. The compositions were then compression molded at 400° F. for five minutes into plaques measuring 2"×5"×⅛. Samples for testing were trimmed to meet the size requirements for Oxygen Index or UL-94 procedures.

Shell 5520, a registered trademark of Shell Chemical Co., is a polypropylene resin with a melt index of 5 gm/10 minutes. The flame retardant halogenated aliphatic bisimide used in Examples 1-10 is N,N'-1,2-ethane-bis(5,6-dibromonorbornane-2,3-dicarboximide). DMDPB is the flame retardant synergist 2,3-dimethyl-2,3-diphenylbutane. Alternative or additional flame retardant synergists used in Examples 5-10 are antimony oxide and diisodecyl pentaerythritol diphosphite (DIPEDP). The quantities of each component are presented in Table I as weight percent based on the total weight of the polypropylene composition.

Two tests were used to evaluate the flame retardant effectiveness of various concentrations of the flame retardant compound and synergists in Shell 5520. They were the Oxygen Index Test and UL-94. The Oxygen Index is defined as the minimal volume fraction of oxygen in a slowly rising gaseous atmosphere that will sustain the candle like burning of a stick of polymer. The higher the Oxygen Index of a molded article, the more flame retardant it is.

The UL-94 vertical burn test is used to classify polymer specimens as V-0, V-1, V-2 and burn. Polymer specimens are held vertically and ignited at the bottom. Classification is based on burn times, the presence or absence of flame drip and the presence and extent of afterglow.

TABLE I

| Example | 1 | 2 | 3 | 4 | 5 | 6 | 7 | 8 | 9 | 10 |
|---|---|---|---|---|---|---|---|---|---|---|
| Shell 5520 | 94.0 | 95.0 | 95.5 | 96.0 | 95.0 | 95.0 | 95.5 | 95.0 | 95.0 | 95.5 |
| Flame Retardant | 4.0 | 4.0 | 4.0 | 4.0 | 4.0 | 4.0 | 4.0 | 4.0 | 4.0 | 4.0 |
| DMDPB | 2.0 | 1.0 | 0.5 | — | — | 0.5 | — | — | 0.5 | — |
| Antimony Oxide | — | — | — | — | 1.0 | 0.5 | 0.5 | — | — | — |
| DIPEDP | — | — | — | — | — | — | — | 1.0 | 0.5 | 0.5 |
| Oxygen Index | 24.5 | 23.2 | 23.2 | 19.6 | 24.8 | 28.9 | 22.6 | 20.4 | 27.2 | 20.4 |
| UL-94 | V-2 | V-2 | V-2 | burn | V-2 | V-2 | V-2 | burn | V-2 | burn |

As indicated by the above table N,N'-1,2-ethane-bis(5,6-dibromonorbornane-2,3-dicarboximide) and 2,3-dimethyl-2,3-diphenylbutane may be added to a polypropylene composition to obtain improved flame retardant properties. Optional synergists are antimony oxide and a trialkyl phosphite such as diisodecyl pentaerythritol diphosphite.

We claim:
1. A flame retardant polymer composition comprising:
   (a) a polypropylene polymer selected from the group consisting of polypropylene and copolymers containing at least 50% by weight of co-polymerized propylene monomer,
   (b) a halogenated aliphatic bisimide corresponding to the formula:

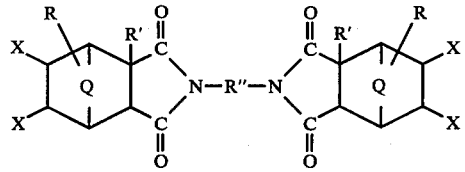

wherein Q is methylene or oxygen, X is chlorine or bromine, R is hydrogen or an alkyl group containing 1-5 carbon atoms, R' is hydrogen or methyl and R" is an organic group containing 1-15 carbon atoms and
   (c) 2,3-dimethyl-2,3-diphenylbutane.

2. A polymer composition as recited in claim 1 wherein the halogenated aliphatic bisimide corresponds to the formula:

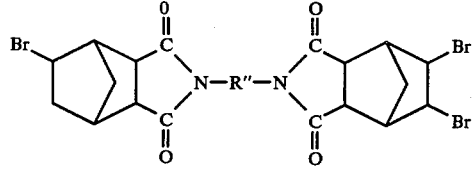

wherein R" is an organic group containing 1-15 carbon atoms.

3. A polymer composition, as recited in claim 2, wherein R" is ethylene.

UNITED STATES PATENT AND TRADEMARK OFFICE
CERTIFICATE OF CORRECTION

PATENT NO. : 4,430,467
DATED : FEBRUARY 7, 1984
INVENTOR(S) : JOSEPH M. LESNIEWSKI and MICHAEL J. BREZA It is certified that error appears in the above-identified patent and that said Letters Patent is hereby corrected as shown below:

Column 3, line 50, appears as follows:

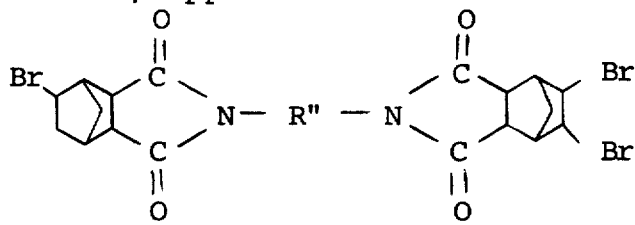

and should be:

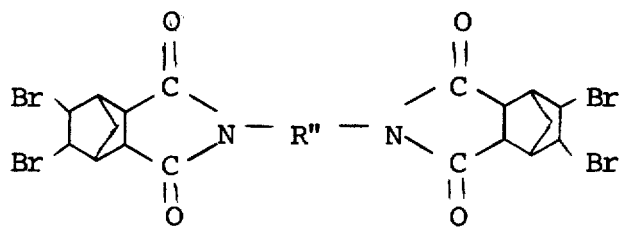

UNITED STATES PATENT AND TRADEMARK OFFICE
CERTIFICATE OF CORRECTION

PATENT NO. : 4,430,467

DATED : FEBRUARY 7, 1984

INVENTOR(S) : JOSEPH M. LESNIEWSKI and MICHAEL J. BREZA

Page 2 of 2

It is certified that error appears in the above-identified patent and that said Letters Patent is hereby corrected as shown below:

Column 6, line 55, appears as follows:

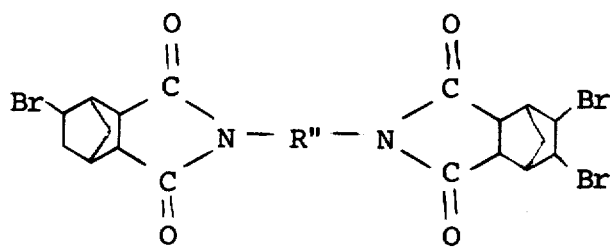

and should be:

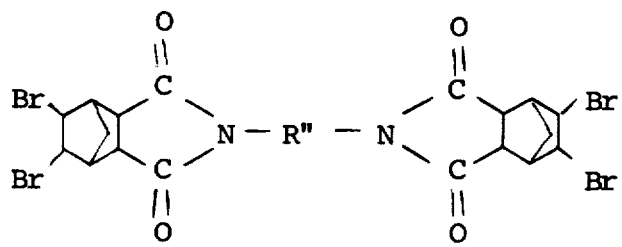

Signed and Sealed this

Sixteenth Day of October 1984

[SEAL]

Attest:

Attesting Officer

GERALD J. MOSSINGHOFF

Commissioner of Patents and Trademarks